Aug. 19, 1952   H. MICHELSEN   2,607,636
MOUNTING FOR SLIDABLE MEMBERS
Filed Dec. 26, 1946
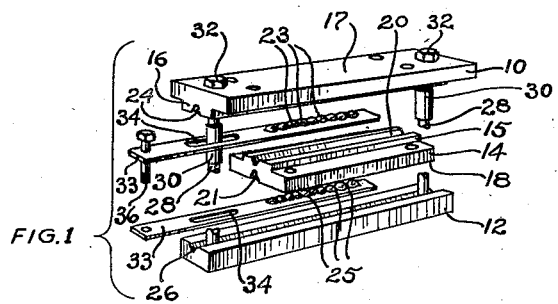
FIG. 1
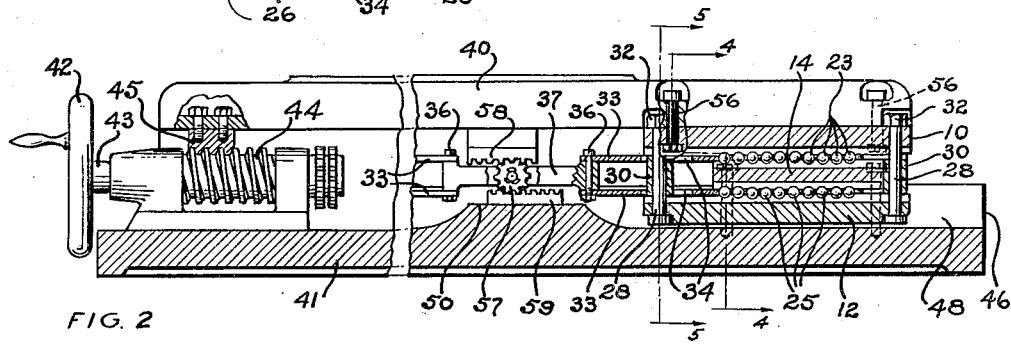
FIG. 2
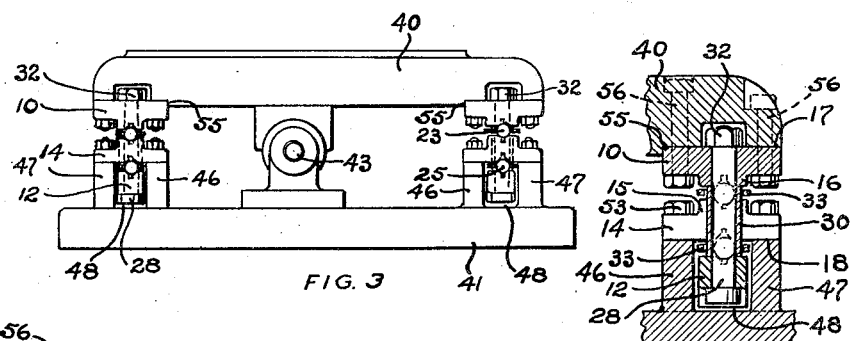
FIG. 3
FIG. 5
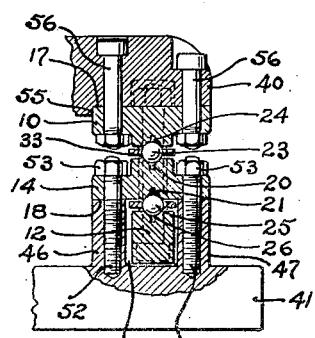
FIG. 4
INVENTOR
HENRY MICHELSEN.
BY Romeyn A. Spare
HIS ATTORNEY.

Patented Aug. 19, 1952

2,607,636

UNITED STATES PATENT OFFICE 2,607,636

MOUNTING FOR SLIDABLE MEMBERS

Henry Michelsen, Bristol, Conn., assignor to General Motors Corporation, Detroit, Mich., a corporation of Delaware Application December 26, 1946, Serial No. 718,338

17 Claims. (Cl. 308—6)

This invention relates to mountings for slidable members and particularly to antifriction slide bearings arranged to support a member for linear reciprocation.

In machine tools and other precision mechanisms embodying a reciprocatory table or like member, it is usual to provide the table and its supporting base with smooth interfitting lubricant-cooled ways which permit slidable reciprocation of the table along a predetermined rectilinear path. Whenever the table is brought to rest, the films of lubricant between these ways tend to break down causing objectionable frictional engagement of nonlubricated portions of these ways. It is well recognized that much more power is required to start such a table moving than is required to maintain it in reciprocation. To overcome this difficulty, it has been proposed to place rolling elements between the raceways, but such an antifrictionally supported table has often lacked precise rectilinear motion since the rolling elements do not all tend to remain in uniformly rolling contact with the raceways.

An object of this invention is to provide for a slidable member an improved anti-frictional mounting of simple construction that will overcome the above-noted objections and which will provide for relative antifrictional rectilinear reciprocation of a pair of members. Another object is to provide an improved antifriction slide bearing which may be detachably secured as a unit-handling assembly to a pair of members to provide for antifrictional rectilinear reciprocation of one of the members with respect to the other. A further object is to provide a unit-handling preloaded antifriction slide bearing having a plurality of rolling elements which uniformly distribute the load.

To these ends and also to improve generally upon devices of this character, my invention consists in the various matters hereinafter described and claimed. In its broader aspects, the invention is not necessarily limited to the specific structures selected for illustrative purposes in the accompanying drawings wherein Figure 1 is an exploded perspective view of my slide bearing;

Figure 2 is a fragmentary view partly in section and showing my bearing as one of the supporting units for a reciprocable table;

Figure 3 is an end view of the antifrictionally supported table;

Figure 4 is an enlarged fragmentary cross sectional view taken substantially along the line 4—4 of Figure 2; and Figure 5 is an enlarged fragmentary cross sectional view taken along the line 5—5 of Figure 2.

My slidable member mounting generally comprises one or more antifriction slide bearings arranged to be individually installed as unit-handling preloaded assemblies. Each bearing has oblong upper and lower race members 10 and 12 and an oblong intermediate race member 14 that is shorter than the other race members. The top of the intermediate race member 14 has a longitudinally extending centrally disposed raised portion 15, and the bottom of the upper race member 10 has a corresponding longitudinally extending depending portion 16. The top of the upper race member 10 and the bottom of the intermediate race member 14 are respectively provided with flat faces 17 and 18 against which other members are demountably secured when my bearing is fastened in operative position. The top and bottom of the intermediate race member 14 is provided with centrally disposed longitudinally extending upper and lower rectilinear raceways 20 and 21 which are parallel to each other and to the flat face 18. Rolling elements, as a series of spaced balls 23, rotatably engage the raceway 20 and also rotatably engage a similar rectilinear raceway 24 longitudinally cut in the bottom of the depending portion 16 and disposed parallel to the flat face 17. A similar set of rolling elements, as balls 25, rotatably engage the lower rectilinear raceway 21 and also rotatably engage a rectilinear raceway 26 centrally and longitudinally disposed in the top of the lower race member 12.

Clamping bolts 28, vertically extending through centrally disposed bores in each end of the upper and lower race members 10 and 12 and also extending through spacing sleeves 30 between these race members, demountably secure the bearing parts in unit-handling relation and limit the extent of relative reciprocation of the bearing race members. I preferably locate the heads of these bolts in recesses in the underside of the lower race member 12, and clamping nuts 32 on the upper ends of the bolts are tightened against the face 17. The length of the sleeves 30, which determine the spacing of the upper and lower race members 10 and 12, are such that both complements of balls 23 and 25 engage their raceways under a uniformly distributed and predetermined load. Each of the raceways is preferably V-shaped in cross section so that the balls will not bottom in the raceways and will permit rectilinear antifrictional reciprocation of the relatively movable race members while restraining these race members from relatively lateral movement. The engagement of the balls with the parallel raceways also maintains the surfaces 17 and 18 in parallel relation.

To retain the balls in uniformly spaced rolling relation within their raceways, there is provided for each complement of balls a separator 33 formed from a strip of sheet metal or other suitable material. Extending longitudinally of and from one end of each separator is a series of spaced bores each of which forms a pocket for loosely receiving one of the balls, and the separator at each end of these pockets is preferably slightly peened or spun over to loosely hold the balls in the pockets and to loosely support the separator on the balls out of engagement with the adjacent race members. The separators 33 are correspondingly slotted at 34 to loosely receive one of the spacer sleeves 30 and allow for the desired extent of ball movement. These slots 34 are preferably so located and of such length that the balls are prevented from running out of the raceways 20 and 21. The outer ends of these separators which extend beyond the race members, are correspondingly bored to receive a bolt 36 which demountably fastens both cages to a control link 37 that regulates the cage movement as will be later described.

In the illustrations there is shown a reciprocatory slide member as a table 40 each end of which is similarly supported by a pair of my interchangeable slide bearings for antifrictional rectilinear reciprocation on a supporting base 41. Suitable reciprocating mechanism, for simplicity, is herein shown as having a hand wheel 42 mounted to rotate a shaft 43 journalled in bearings fastened to the base 41, and an axially positioned screw 44, secured to and rotatable with this shaft, threadably engages a nut 45 fastened to the underside of the table.

Extending upwardly from and lengthwise of the base 41 at each of its sides is a pair of adjacent ribs 46 and 47 having co-planar top faces. Between each pair of ribs is a longitudinally extending groove 48 having a land 50 intermediate of its ends. Spaced studs 52, threaded in and vertically projecting from these ribs, extend through intermediate race member bores at each side of the raised portions 15, and nuts 53 on these studs demountably secure these intermediate race members in position with their flat bottom faces 18 respectively seated on the flat faces of the ribs and beneath each corner of the table 40. The lower race members 12 and bearing parts beneath each intermediate race member depend within one of the grooves 48 in spaced relation to the base. Each corner of the table above the ribs 46, 47 is recessed at 55 to demountably receive one of the upper race members 10, and bolts 56, extending through the table and through bores at each side of the depending portions 16, demountably secure these upper race members 10 in position with the flat faces 17 seated against corresponding flat faces in the recesses 55. The underside of the table is recessed to receive the nuts 32, and, if desired, the top of the table may be counterbored to receive the heads of the bolts 56.

As illustrated in Figure 2, the two pairs of opposed separators 33 at each end of the base are respectively secured by bolts 36 to the ends of the control link 37 to whose intermediate portion is secured a laterally projecting stud that rotatably supports a gear 57 meshed with a rack 58 secured to the underside of the table and also meshed with a rack 59 secured to the land 50. When the hand wheel 42 is turned to traverse the table 40, the gear 57 is advanced by the movable rack 58 along the fixed rack 59 at one half of the rate of table advance which traverses the separators 33 in the same direction as and at the same rate of advance as that of the sets of balls 23 and 25 along the raceway of the intermediate race members 14. Hence, the balls are guided in uniformly spaced rolling engagement with their raceways and are effectively prevented from dropping out of operative position. Also, the positive drive of these separators at the rate of ball movement reduces the frictional engagement between the balls and their separators to a minimum.

I claim:

1. A unit-handling antifriction bearing comprising an upper race member and a lower race member, demountable members rigidly securing said race members in predetermined spaced relation, an intermediate race member between and spaced from the other race members; the adjacent portions of the upper, intermediate and lower race members being provided with raceways, rolling elements in said raceways to provide for relative antifrictional movement between the intermediate race member and said other race members, and said demountable members limiting the relative longitudinal movement between the intermediate race member and the other race members.

2. In a unit-handling antifriction slide bearing, upper and lower race members, an intermediate race member between said other race members, the upper and intermediate race members being each provided with a rectilinear raceway, said raceways being parallel and opening towards each other, the intermediate and lower race members being each provided with a rectilinear raceway and said raceways being parallel and opening towards each other, a plurality of balls in each pair of adjacent raceways providing for relative rectilinear antifrictional reciprocation between the intermediate race member and said other race members, a securing member beyond each end of and in the path of said intermediate member and rigidly holding the upper and lower race members in predetermined spaced relation with said balls engaged by the raceways under predetermined load.

3. In an antifriction slide bearing, oblong upper and lower race members each of which is provided with a rectilinear raceway, said raceways being parallel and opening towards each other, an intermediate race member shorter than said other race members and having parallel upper and lower raceways opening respectively towards the upper race member and towards the lower race member, a set of balls engaging each pair of facing raceways, bolts and cooperating spacing elements detachably fastening the upper and lower race members in fixed spaced relation and limiting the relative reciprocable movement between the intermediate race member and the other race members, said bolts and spacing elements also maintaining the bearing parts in unit-handling relation and maintaining the balls in raceways contact under a predetermined pressure, and ball guiding means that prevents said balls from running out of the end of any of said raceways.

4. In an antifriction slide bearing, upper and lower race members each of which is provided with a raceway, said raceways being parallel and opening towards each other, an intermediate race member shorter than the other race members and having upper and lower parallel raceways opening respectively towards the raceway in said upper race member and towards the raceway in said lower race member, each of said raceways being generally V-shaped in cross section, a plurality of balls engaging each raceway along two raceway elements, bolts and cooperating spacing elements detachably fastening the upper and lower race members in relatively immovable fixed spaced relation and securing the bearing parts in unit-handling relation and holding the balls in rotatable raceway contact under predetermined load, and ball guiding means which holds the balls in spaced relation and which also prevents the balls from running out of said raceways.

5. In a device of the character indicated, a base, a reciprocable member, an antifriction slide bearing having spaced upper and lower and intermediate race members, means antifrictionally mounting said intermediate race member to provide for relative rectilinear movement between the intermediate race member and said other race members, securing means fastening the upper and lower race members in predetermined spaced relation and holding the bearing parts in unit-handling relation, and fastening elements securing one of said race members to the base and securing another of the race members to said reciprocable member.

6. In a device of the character indicated, a base, an antifriction slide bearing including a pair of relatively movable race members each of which is provided with a rectilinear raceway, a plurality of rolling elements engaging said raceways, a separator locating the rolling elements in spaced relation, fastening members demountably secured to one of the race members and holding the bearing parts in unit-handling relation and maintaining the rolling elements in raceway engagement, fastening elements securing one of the race members to the base, a reciprocable member secured to said other race member, and mechanism responsive to the movement of said reciprocable member for moving the separator at the same rate as and in the same direction as the rectilinear movement of said rolling elements.

7. In a device of the character indicated, a base, a reciprocable member, an antifriction slide bearing having an intermediate race member and upper and lower race members, rolling elements providing for relative rectilinear antifrictional movement between the intermediate race member and said other race members, means securing one of the relatively movable race members to the base, means securing one of the other relatively movable race members to said reciprocable member, and demountable clamping mechanism independent of the base and independent of said reciprocable member for imparting a predetermined initial load of the race members against the rolling elements and for maintaining the bearing parts in unit-handling relation.

8. In a device of the character indicated, a base, an antifriction bearing having upper and lower and intermediate race members, sets of rolling elements engaging rectilinear raceways in said race members and providing for relative rectilinear antifrictional movement between the intermediate race member and said other race members, a separator maintaining the rolling elements of one set in spaced relation, means securing the upper and lower race members in fixed spaced relation and for maintaining the bearing parts in unit-handling assembly with the rolling elements engaged by the race members under an initial predetermined load, means demountably securing one of the relatively movable race members to the base, a reciprocable member demountably secured to one of the other relatively movable race members, and mechanism responsive to the movement of the reciprocable member for moving the separator at the same rate as and in the same direction as the rectilinear movement of said rolling elements.

9. In a device of the character indicated, a base, an antifriction slide bearing having upper and lower and intermediate race members, a set of rolling elements engaging opposed rectilinear raceways in the intermediate and upper race members, another set of rolling elements engaging opposed rectilinear raceways in the intermediate and lower race members, said rolling elements co-operatively providing for relative rectilinear reciprocation between the intermediate race member and said other race members, separators respectively maintaining the rolling elements of each set in spaced relation, means demountably securing the upper and lower race members in relatively immovable predetermined spaced relation and providing a unit-handling bearing assembly, a reciprocable member demountably secured to one of the relatively movable race members, means securing one of said other relatively movable race members to the base, and mechanism responsive to the movement of said reciprocable member for simultaneously advancing both separators at the rate of rolling advance of said rolling elements in their raceways.

10. In a device of the character indicated, a base, an antifriction slide bearing having an intermediate race member between upper and lower race members, a set of balls engaging opposed rectilinear raceways in the intermediate and upper race members, another set of balls engaging opposed rectilinear raceways in the intermediate and lower race members, separators respectively maintaining the balls of each set in spaced relation and preventing said balls from running out of their raceways, means securing the upper and lower race members in predetermined spaced relation and holding said raceways against the balls under an initial predetermined load, means securing one of the relatively movable race members to the base, a reciprocable member supported by another of said relatively movable race members, and mechanism responsive to the movement of the reciprocable member for simultaneously moving both separators in the direction of said reciprocable member movement and at the same rate of advance as that of said balls.

11. In a device of the character indicated, a base having a longitudinally extending groove, a reciprocable table above the base, an antifriction bearing provided with spaced upper and lower and intermediate race members, sets of rolling elements respectively engaging parallel rectilinear raceways in adjacent portions of said race members to provide for rectilinear reciprocation of the upper and lower race members relative to said intermediate race member, clamping bolts and co-operating spacing elements holding the upper and lower race members in fixed spaced relation to provide a unit-handling bearing assembly, means demountably fastening the intermediate race member to the base with said lower race member received in spaced relation in said groove, and means detachably mounting the table on said upper race member.

12. In a device of the character indicated, a base having a longitudinally extending groove, a reciprocable table above the base, an antifriction bearing provided with spaced upper and lower and intermediate race members, sets of rolling elements respectively engaging parallel spaced raceways in adjacent portions of said race members to provide for relative rectilinear reciprocation between the upper and lower race members and said intermediate race member, separators for respectively maintaining the rolling elements of each set in spaced relation, clamping bolts and cooperating spacing elements holding the upper and lower race members in fixed relation and providing a unit-handling bearing assembly, means demountably fastening the intermediate race member to the base with said lower race member received in spaced relation in said groove, means detachably mounting the table on said upper race member and means responsive to the table advance for simultaneously advancing both separators in the same direction of movement and at the same rate as the rolling advance of the rolling elements in their raceways.

13. In a device of the character indicated, a base having a longitudinally extending groove, a reciprocable table above the base, an antifriction slide bearing provided with spaced upper and lower and intermediate race members, sets of balls respectively engaging parallel rectilinear raceways in adjacent portions of said race members to provide for antifrictional rectilinear reciprocation of the upper and lower race members relative to said intermediate race member, separators respectively supported by and maintaining each set of balls in spaced relation, clamping bolts and cooperating spacing elements holding the upper and lower race members in fixed spaced relation to provide a unit-handling bearing assembly with each set of balls engaged by the raceways under predetermined initial load, means demountably fastening the intermediate race member to the base with said lower race member received in spaced relation in said groove, means detachably mounting the table on said upper race member, and mechanism including a gear and rack connected between the table and the base for causing both separators to advance at the same rate as and in the same direction as the rolling movement of said balls in their raceways.

14. An antifriction bearing comprising an upper race member and a lower race member, an intermediate race member, rolling elements antifrictionally mounting the intermediate race member between and in longitudinally movable relation to said other race members, and demountable clamping mechanism holding the upper and lower race members in predetermined spaced relation and located in the path of and beyond the ends of the intermediate race member for securing the bearing parts in unit-handling relation.

15. A unit-handling antifriction bearing comprising upper and lower race members, an intermediate race member, rolling elements antifrictionally mounting the intermediate race member between and in longitudinally movable relation to said other race members, and demountable clamping mechanism securing the upper and lower race members in predetermined spaced relation to each other and limiting the extent of longitudinal movement between the intermediate race member and said other race members.

16. In an antifriction slide bearing, upper and lower race members, a rectilinear raceway in each of said members, said raceways being parallel and opening towards each other, an intermediate race member between said other race members and having parallel upper and lower raceways respectively opening towards the raceway in said upper race member and towards the raceway in said lower race member, rolling elements in said raceways providing for relative antifriction rectilinear movement between the intermediate race member and said other race members, and securing members demountably holding the upper and lower race members in predetermined spaced relation and limiting the extent of said relative rectilinear movement.

17. An antifriction slide bearing comprising upper and lower race members, an intermediate race member between and spaced from said other race members, the upper and lower race members being each provided with a rectilinear raceway opening towards the intermediate race member, the intermediate race member having a pair of parallel rectilinear raceways one of which opens towards the raceway in the upper race member and the other of which opens towards the raceway in the lower race member, rolling elements in the adjacent raceways, and clamping members and spacing elements rigidly securing the upper and lower race members in predetermined spaced relation to each other and holding said raceways against the rolling elements under an initial predetermined load.

HENRY MICHELSEN.

REFERENCES CITED

The following references are of record in the file of this patent:

UNITED STATES PATENTS

| Number | Name | Date |
| --- | --- | --- |
| 162,652 | Hoe | Apr. 27, 1875 |
| 560,281 | Rauhoff | May 19, 1896 |
| 1,005,055 | Miller | Oct. 3, 1911 |
| 2,028,718 | Heine | Jan. 21, 1936 |
| 2,523,396 | Shea | Sept. 26, 1950 |

FOREIGN PATENTS

| Number | Country | Date |
| --- | --- | --- |
| 609,836 | France | May 22, 1926 |